United States Patent
Ohashi

(10) Patent No.: US 7,817,510 B2
(45) Date of Patent: Oct. 19, 2010

(54) RECORD APPARATUS, RECORD AND PLAYBACK SYSTEM

(75) Inventor: Tsuyoshi Ohashi, Hashima (JP)

(73) Assignee: Brother Kogyo Kabushiki Kaisha, Nagoya-shi, Aicihi-ken (JP)

( * ) Notice: Subject to any disclaimer, the term of this patent is extended or adjusted under 35 U.S.C. 154(b) by 329 days.

(21) Appl. No.: 11/929,454

(22) Filed: Oct. 30, 2007

(65) Prior Publication Data
US 2008/0101194 A1 May 1, 2008

(30) Foreign Application Priority Data
Oct. 31, 2006 (JP) .............................. 2006-295659

(51) Int. Cl.
*G11B 5/09* (2006.01)
(52) U.S. Cl. ..................... 369/47.1; 369/59.1
(58) Field of Classification Search ................. None
See application file for complete search history.

(56) References Cited

U.S. PATENT DOCUMENTS 7,653,919 B2 * 1/2010 Potyrailo et al. ............ 369/273
2006/0181400 A1 * 8/2006 Cox et al. .................... 340/505

FOREIGN PATENT DOCUMENTS

| JP | H09-134346 A | 5/1997 |
| JP | 2005-353237 A | 12/2005 |

* cited by examiner

*Primary Examiner*—Muhammad N. Edun
(74) *Attorney, Agent, or Firm*—Baker Botts L.L.P.

(57) ABSTRACT

A record apparatus includes a media writing unit to record on a disc media information to be recorded stored in a predetermined storage location; a control circuit to record storage-location information of the media information to be recorded on the disc with the media writing unit in a RFID circuit element being attached to the disc and having an IC circuit part to store information and an antenna to transmit and receive information; a radio frequency circuit; and an antenna.

12 Claims, 12 Drawing Sheets

FIG. 12

EXTENDED ATTRIBUTE INFORMATION

|  | A | B | C | STORAGE LOCATION INFORMATION | HISTORY INFORMATION |
|---|---|---|---|---|---|
| FILE1 | ○ | × | × | ¥¥server¥‥¥ FILE1 | 2006/10/‥/‥:‥ |
| FILE2 | ○ | × | ○ | ¥¥server¥‥¥ FILE2 | 2006/10/‥/‥:‥ |
| FILE3 | ○ | ○ | × | ¥¥server¥‥¥ FILE3 | 2006/10/‥/‥:‥ |
| ... | ... | ... | ... | ... | ... |

RECORD APPARATUS, RECORD AND PLAYBACK SYSTEM

CROSS-REFERENCE TO RELATED APPLICATIONS

This application claims priority from JP 2006-295659, filed Oct. 31, 2006, the contents of which are hereby incorporated by reference.

BACKGROUND OF THE INVENTION

1. Field of the Invention

The present invention relates to a record apparatus to record information to be recorded such as images, electronic files, and others in a recording medium, and a record and playback system.

2. Description of the related Art

A record and playback system that reads information to be recorded such as images, electronic files, and others from a recording medium such as a magnetic disc, an optical disc, or the like in which the information to be recorded is recorded has heretofore been known. For example, a record and playback system (a document data processor) that reads recorded document data from a magnetic disc in which the document data is recorded is disclosed in JP, A, 9-134346.

With the prior art, it is possible to read and acquire document data recorded in a magnetic disc. On this occasion, when document data to be recorded contains such information as to be updated from hour to hour like market price information for example, it has been impossible with the prior art to acquire information updated after document data is recorded in a magnetic disc; and thus acquire latest information after updated.

SUMMARY OF THE INVENTION

An object of the present invention is to provide a record apparatus and a record and playback system capable of easily acquiring updated latest contents of information to be recorded even when the contents of the information to be recorded have been updated.

BRIEF DESCRIPTION OF THE DRAWING

FIG. 12 is a table showing an example of table information stored in a memory in a variation when media information is stored in a server connected to a network.

DETAILED DESCRIPTION OF THE PREFERRED EMBODIMENTS

An embodiment according to the present invention will be described hereunder with reference to drawings.

Figure 1:
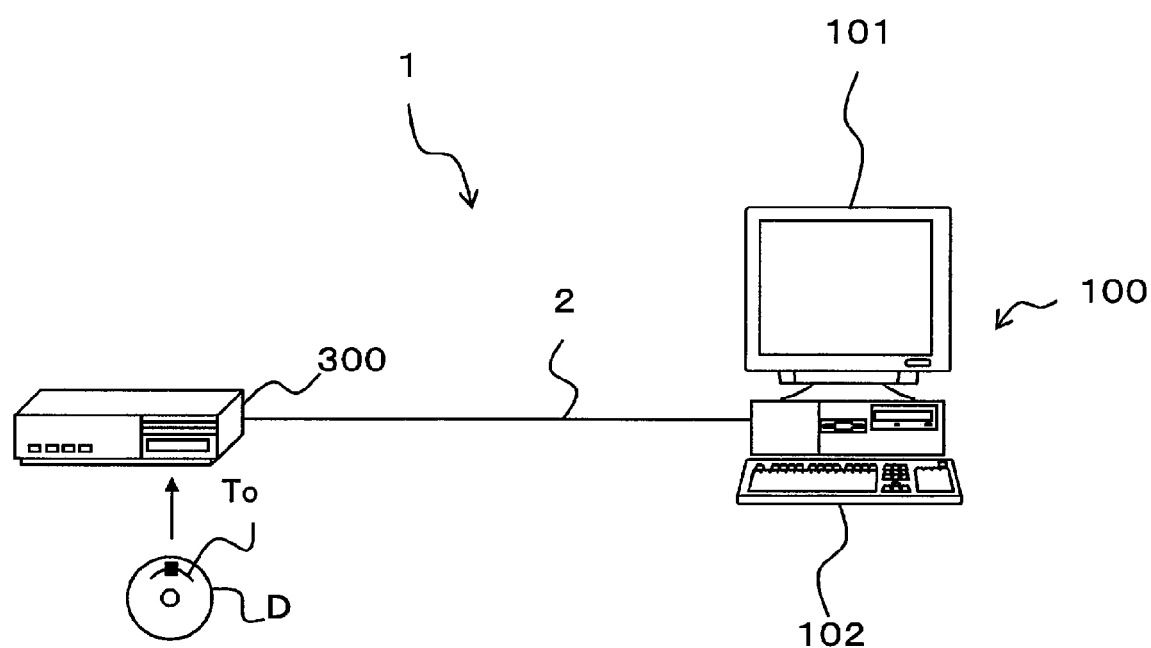
FIG. 1 is a system configuration diagram showing a whole media record and playback system including a record playback apparatus according to an embodiment of the present invention.

FIG. 1 is a system configuration diagram showing a whole media record and playback system including a record playback apparatus 300 (a record apparatus, a record and playback system) according to the present embodiment.

A media record and playback system 1 shown in FIG. 1 includes the aforementioned record playback apparatus 300 to record and playback media information (images, electronic files, and others) on a disc D (a recording medium) such as a CD, a DVD, or the like to which a RFID circuit element To (refer to FIG. 4 to be described below) having an IC circuit part 150 to store information and an antenna 151 (a tag antenna) connected to the IC circuit part 150 is attached; and a PC terminal (or a general purpose computer, hereunder referred to as "PC") 100 being connected to the record playback apparatus 300 through a connecting means 2 such as a USB cable or the like and having a display 101 and an operation unit 102.

Figure 2:
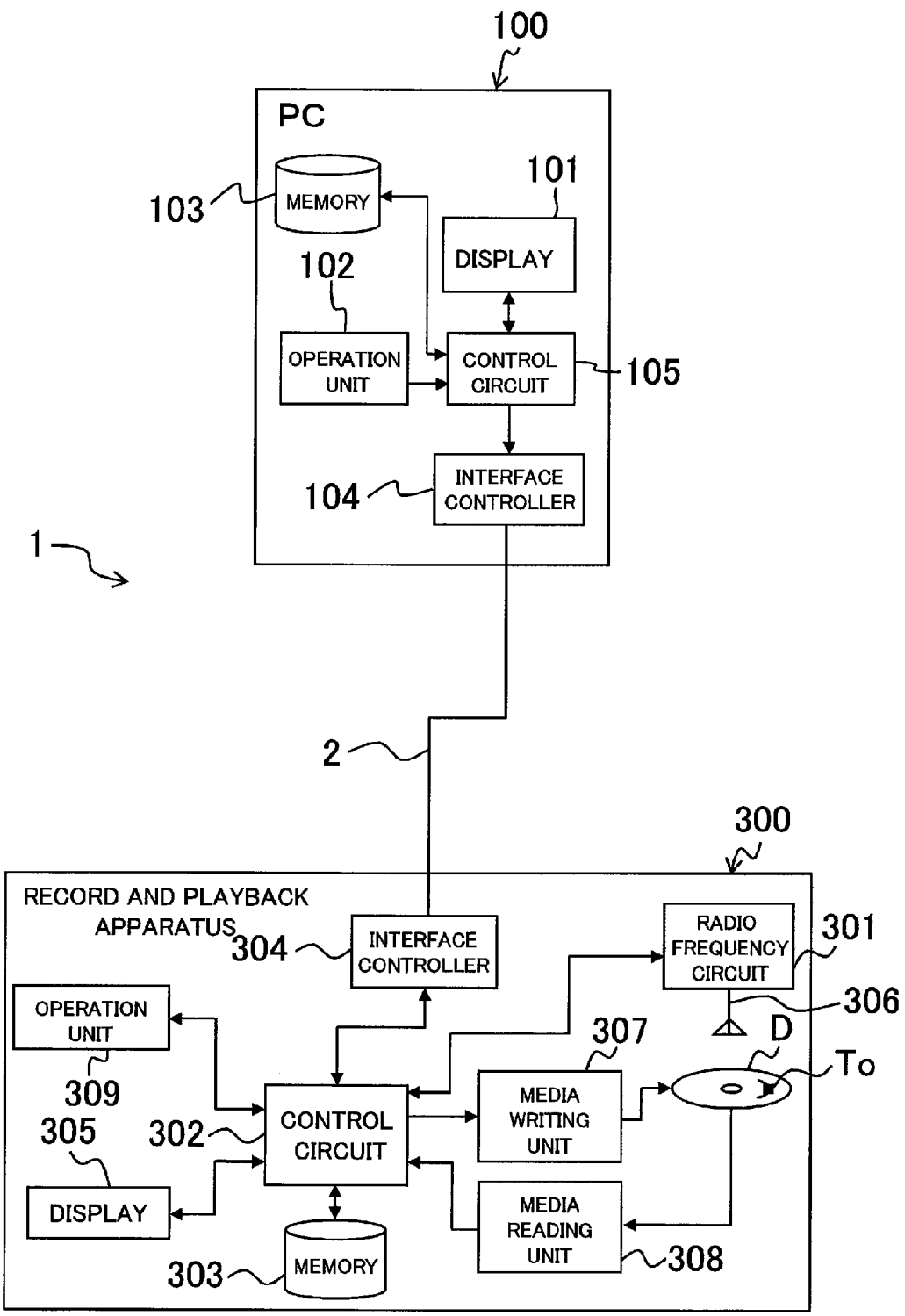
FIG. 2 is a functional block diagram showing detailed functions of a PC and a record playback apparatus constituting the media record and playback system.

FIG. 2 is a functional block diagram showing detailed functions of the PC 100 and the record playback apparatus 300 constituting the media record and playback system 1.

In FIG. 2, the PC 100 is provided with the display 101 to perform predetermined display such as various kinds of input screens; the operation unit 102 having appropriate buttons, keys, a mouse, and others which an operator handles and uses for input operations; a memory 103 comprising, for example, a hard disc or the like to store media information (images, electronic files, and others), various kinds of applications, and others recorded on the disc D; an interface controller 104 to control communication with the record playback apparatus 300 through the connecting means 2; and a control circuit 105 to control the operations of the whole PC 100 including the display 101, the operation unit 102, the memory 103, and the interface controller 104.

Meanwhile, the record playback apparatus 300 is provided with a display 305 to perform predetermined display; an operation unit 309 having appropriate buttons, keys, and others which an operator handles and uses for input operations; a memory 303 comprising, for example, a memory to temporarily store media information (images, electronic files, and others) to be recorded on the disc D, tag data written in a RFID circuit element To, and others; a control circuit 302 to control the whole record playback apparatus 300; a media writing unit 307 (an record device for information) to write information on the disc D by supplying media information processed into a predetermined mode by the control circuit 302 to an optical pickup (not shown in the figure) as a drive signal and thereby irradiating the disc D with a laser light for data writing; a media reading unit 308 (an information playback device) to read the media information recorded on the disc D based on the output power of reflected light received when the optical pickup irradiates the disc D by the laser light for data reading; an antenna 306 (a record device for storage location, a first communicating device, and a second communicating device) to transmit and receive information by radio communication with a RFID circuit element To attached to the disc D; a radio frequency circuit 301; and an interface controller 304 to control communication with the PC 100 through the connecting means 2.

The radio frequency circuit 301 and the control circuit 302 produce access information to the IC circuit part 150 of a RFID circuit element To, transmit the access information to the RFID circuit element To attached to the disc D through the antenna 306, and transmit and receive information to and from the IC circuit part 150 of the RFID circuit element To. Further, the control circuit 302 is connected to the PC 100 through the connecting means 2 and can transmit and receive information to and from the PC 100.

Figure 3:
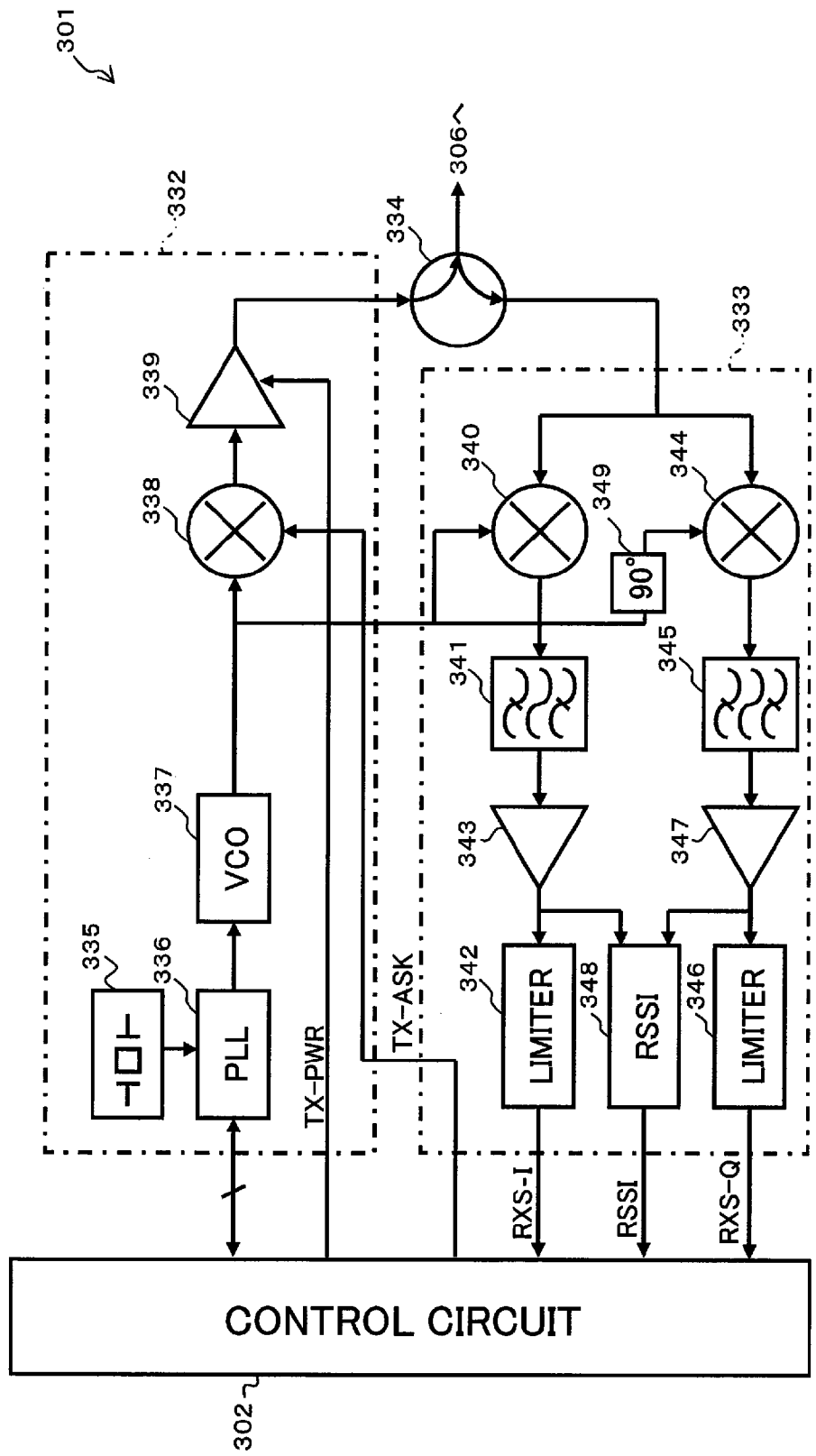
FIG. 3 is a functional block diagram showing detailed functions of a radio frequency circuit.

FIG. 3 is a functional block diagram showing detailed functions of the radio frequency circuit 301. In FIG. 3, the radio frequency circuit 301 includes a transmitting portion 332 to transmit signals to a RFID circuit element To through the antenna 306; a receiving portion 333 to which reflected waves from the RFID circuit element To received by the antenna 306 are input; and a transmit-receive splitter 334.

The transmitting portion 332 includes a crystal oscillator 335 to generate carrier waves in order to access (read) RFID tag information in the IC circuit part 150 of the RFID circuit element To; a PLL (Phase Locked Loop) 336; a VCO (Voltage Controlled Oscillator) 337; a transmission multiplying circuit 338 to modulate (in this case, amplitude modulation based on "TX_ASK" signals coming from the control circuit 302) the generated carrier waves based on signals supplied from the control circuit 302 (here, in the case of amplitude modulation, an amplification factor variable amplifier or the like may be used); and a transmission amplifier 339 to determine an amplification factor by "TX_PWR" signals coming from the control circuit 302 and amplify the modulated waves modulated by the transmission multiplying circuit 338. The generated carrier waves preferably use a frequency in the UHF band, and output from the transmission amplifier 339 is transmitted to the antenna 306 through the transmit-receive splitter 334 and supplied to the IC circuit part 150 of the RFID circuit element To.

The receiving portion 333 includes a first receiving signal multiplying circuit 340 to multiply the generated carrier waves by the reflected waves from the RFID circuit element To received by the antenna 306; a first band-pass filter 341 to pick up only the signals of a necessary band from the output of the first receiving signal multiplying circuit 340; a first receiving signal amplifier 343 to amplify the output of the first band-pass filter 341 and supply it to a first limiter 342, a second receiving signal multiplying circuit 344 to multiply the carrier waves the phase of which is shifted at 90° by a phase shifter 349 after generated by the reflected waves from the RFID circuit element To received by the antenna 306; a second band-pass filter 345 to pick up only the signals of a necessary band from the output of the second receiving signal multiplying circuit 344; and a second receiving signal amplifier 347 to receive and amplify the output of the second band-pass filter 345 and supply it to a second limiter 346. Then, the signal "RXS-I" output from the first limiter 342 and the signal "RXS-Q" output from the second limiter 346 are input into the control circuit 302 and processed therein.

Further, the outputs of the first and second receiving signal amplifiers 343 and 347 are input also into an RSSI (Received Signal Strength Indicator) circuit 348, and the signal "RSSI" representing the strength of those signals is input into the control circuit 302.

Figure 4:
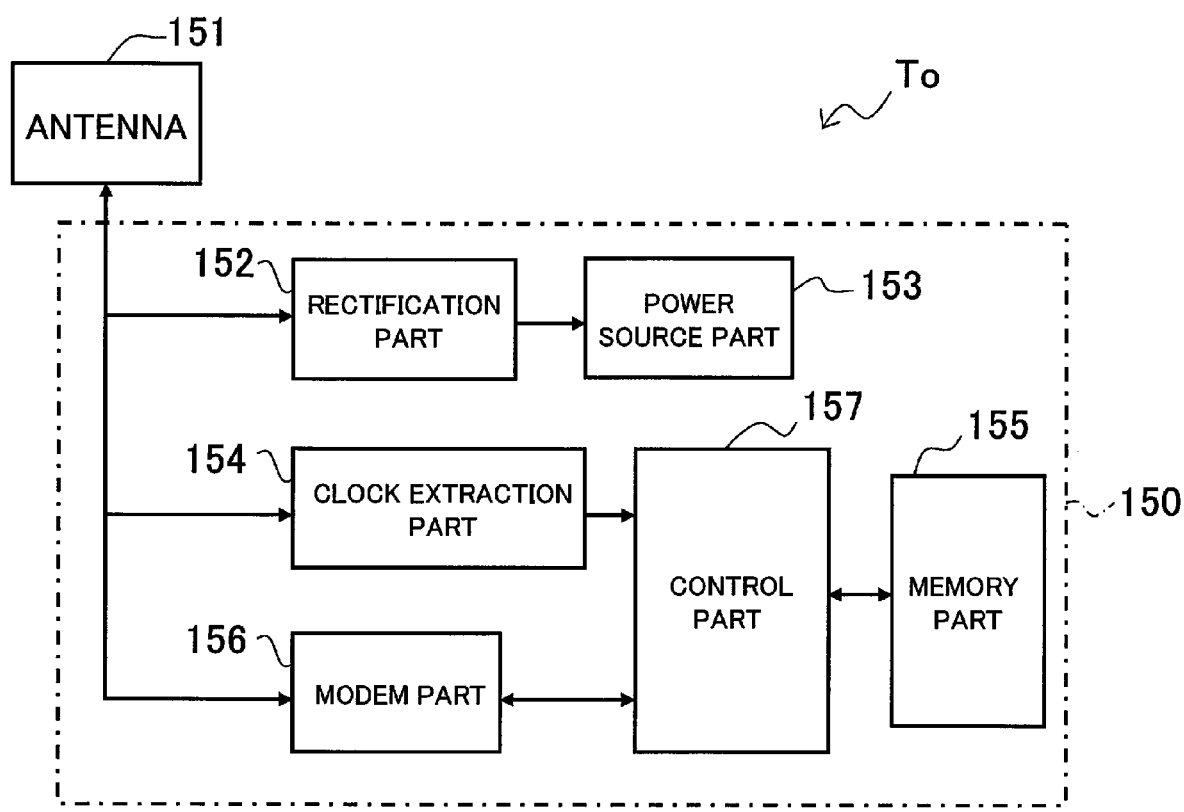
FIG. 4 is a block diagram showing an example of a functional structure of a RFID circuit element attached to a disc.

FIG. 4 is a block diagram showing an example of the functional structure of a RFID circuit element To attached to the disc D.

In FIG. 4, the RFID circuit element To has an antenna 151 to transmit and receive signals to and from the antenna 306 of the record playback apparatus 300 contactlessly by a radio frequency in a shortwave band (13.56 MHz for example), a UHF band, a microwave band, or the like; and an IC circuit part 150 connected to the antenna 151.

The IC circuit part 150 includes a rectification part 152 to rectify carrier waves received by the antenna 151; a power source part 153 to accumulate the energy of the carrier waves rectified by the rectification part 152 and use the energy as the drive power of the IC circuit part 150; a clock extraction part 154 to extract clock signals from carrier waves received by the antenna 151 and supply the clock signals to a controller (described later) 157; a memory part 155 functioning as an information storage part to memorize predetermined information signals; a modem part 156 connected to the antenna 151; and the control part 157 to control the operations of the RFID circuit element To through the rectification part 152, the clock extraction part 154, the modem part 156, and others.

The modem part 156 demodulates the communication signals sent from the antenna 306 in the record playback apparatus 300 and received by the antenna 151; and modulates and reflects carrier waves received by the antenna 306 based on the returned signals from the control part 157.

The control part 157 carries out fundamental control that includes an interpretation of received signals demodulated by the modem part 156, a production of return signals based on the information signals stored in the memory part 155, and transmission of signals by the modem part 156.

In such a configuration, when media information is recorded on a disc D at the record playback apparatus 300, firstly an operator stores media information to be recorded in the memory 103 of the PC 100 and receives extended attribute information (in this case, information on whether or not an operator can access the media information) and others with the operation key 110 of the PC 100. Thereby, in the record playback apparatus 300 that has received the information through the connecting means 2, the received media information is written on the disc D by the media writing unit 307, access information is produced based on the extended attribute information received by the radio frequency circuit 301, and the access information is transmitted to the RFID circuit element To attached to the disc D through the apparatus antenna 306. As a result, the disc D is produced on which the media information to be recorded is recorded, and to which the RFID circuit element To having the extended attribute information and others (storage-location information, history information, and extended attribute information) written into the IC circuit part 150 is attached.

Meanwhile, when media information recorded on the disc D is read by the record playback apparatus 300, firstly an operator inserts the disc D to which a RFID circuit element To is attached into the record playback apparatus 300 and inputs an identification code that is a unique identifier to identify the operator with the operation key 110 of the PC 100. On this occasion, extended attribute information and the like is stored and retained in the IC circuit part 150 of the RFID circuit element To of the disc D as stated above, the information is acquired on the side of the record playback apparatus 300, thereby whether or not the operator can access (playback in this case) the media information is determined based on the extended attribute information and the identification code. If the operator can access the media information, whether or not the media information on the disc D is the latest one is determined based on the history information read from the RFID circuit element To. Then, when the media information is the latest one, the media information is played and, when the media information is not the latest one, extended playback processing is carried out wherein the latest media information updated and stored in the memory 103 of the PC 100 is read and played. On the other hand, if the operator cannot access the media information, the fact is notified to the operator.

Figure 5:
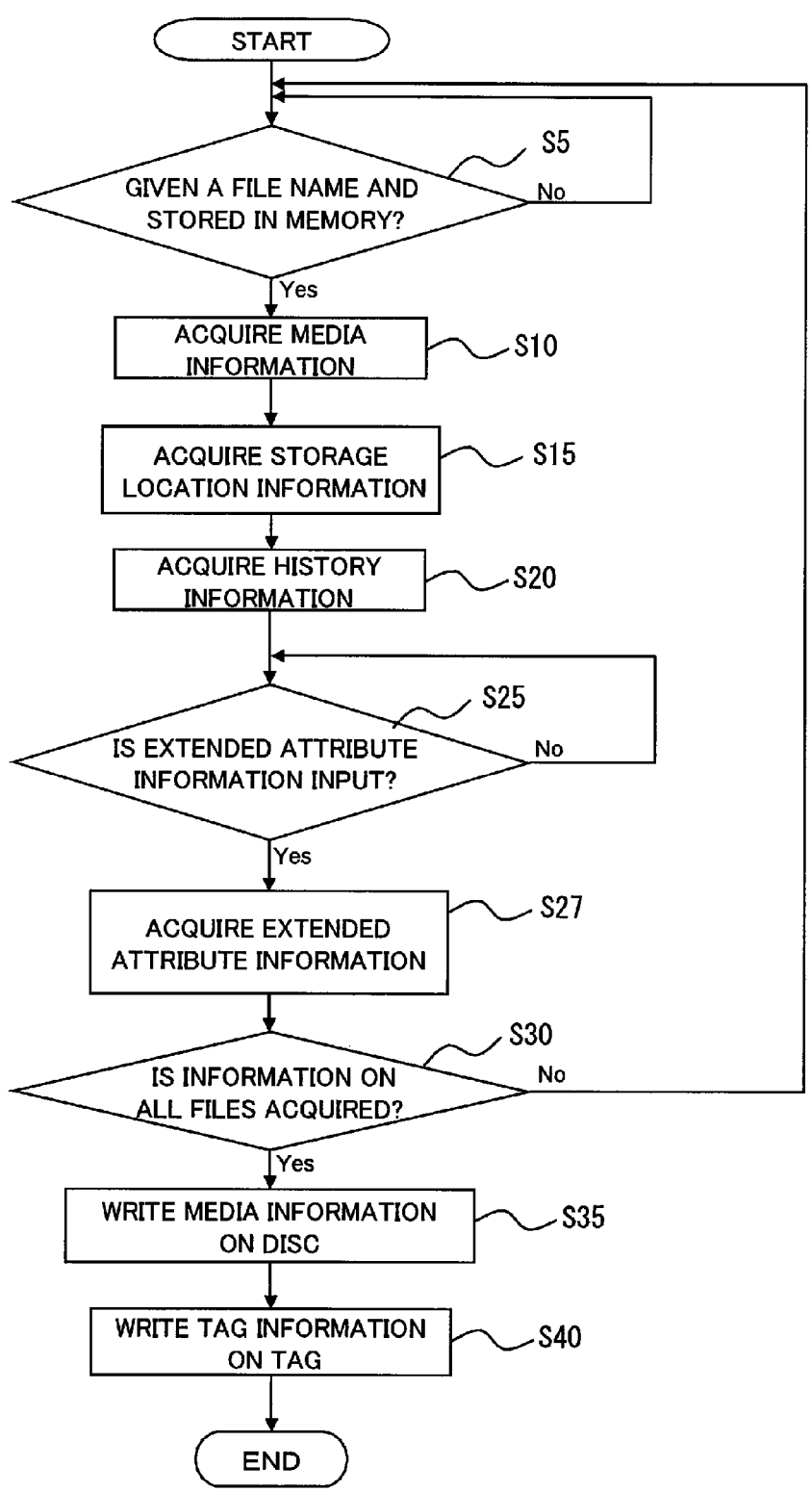
FIG. 5 is a flowchart showing the control procedure carried out with a control circuit of the record playback apparatus when media information is recorded on a disc.

FIG. 5 is a flowchart showing the control procedure carried out by the control circuit 302 of the record playback apparatus 300 when media information is recorded on the disc D.

In FIG. 5, firstly at Step S5, whether or not an operator has given a file name to media information and stored it in the memory 103 is determined by the PC 100. The determination is made by detecting whether or not a signal responding to the fact that the retention is carried out is input from the control circuit 105 of the PC 100. This step is repeated until media information is retained. When the media information is retained, the determination is satisfied, and the procedure moves to subsequent Step S10.

At Step S10, the media information is read and acquired from the memory 103 of the PC 100 through the connecting means 2. Here, the acquired media information is temporarily stored in the memory 303.

At succeeding Step S15, storage-location information representing the location of the media information in the memory 103 (network address information such as URI (Uniform Resource Identifier)) is read and acquired based on the media information stored in the memory 103 of the PC 100. Here, identification information (in the present embodiment, file names, refer to FIG. 6 to be described later) of the media information is included in the storage-location information. Further, the acquired storage-location information is temporarily stored in the memory 303.

At succeeding Step S20, history information representing the production date (in other words, date when the media information is retained in the memory 103) of the media information is read and acquired based on the media information stored in the memory 103 of the PC 100. The acquired history information is temporarily stored in the memory 303. Here, the history information may include not only the production date but also the version information of the media information when the media information is application software or the like, for example.

At succeeding Step S25, control signals are output to the control circuit 105 in the PC 100 through the interface controller 304 and the connecting means 2, display signals are output from the control circuit 105 to the display 101, thereby the input screen of extended attribute information of the media information is displayed on the display 101, an operator is encouraged to input the extended attribute information, and whether or not the operator has input the extended attribute information on the media information by the operation unit 102 in response to the input screen is determined. Here, in this case, the extended attribute information is information on whether or not the operator can access (playback in this case) each of the media information (refer to FIG. 6 to be described later). The step is repeated until the input of the extended attribute information is confirmed and, when it is confirmed, the determination is satisfied and the procedure moves to succeeding Step S27.

At Step S27, the extended attribute information on the media information input by the operator with the operation unit 102 in response to the input screen is input and acquired from the PC 100 through the connecting means 2.

Figure 6:
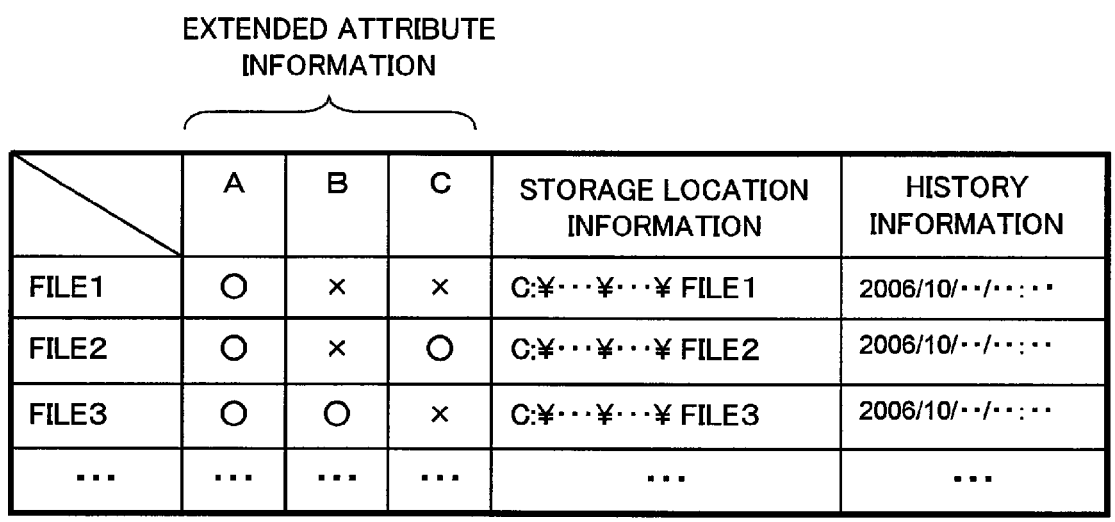
FIG. 6 is a table showing an example of table information stored in a memory.

At succeeding Step S30, whether or not the above information (the media information, the storage-location information, the history information, and the extended attribute information) on all of the media information which the operator wants to record on the disc D is acquired is determined. When the information acquisition is not completed yet, the determination is not satisfied and the procedure goes back to preceding Step S5. Then Steps S5 to S25 are repeated again. On this occasion, by repeating Steps S5 to S25, the storage-location information, the history information, and the extended attribute information of relevant media information are acquired sequentially and such a table as shown in FIG. 6 to be described later is produced in the memory 303. In this manner, when the information acquisition on all of the media information is completed, the determination is satisfied and the procedure moves to the succeeding step.

At Step S35, control signals are output to the media writing unit 307 and all of the media information acquired at aforementioned Step S10 and temporarily stored in the memory 303 is written on the disc D.

At succeeding Step S40, control signals are output to the radio frequency circuit 301, and the table information (the storage-location information, the history information, and the extended attribute information on all of the media information) produced in the memory 303 by repeating aforementioned Steps S5 to S25 is written in the RFID circuit element To attached to the disc D through the antenna 306. After those steps, the flow is terminated.

Here, in the above flow, Steps S25 and S27 constitute an authority-information setting device described in the claims configured to receive an instruction signal for setting an authority and set authority information in response to the signal. Further, Step S40 constitutes a writing control device configured to write the storage-location information or information corresponding thereto in the IC circuit part of the RFID circuit element through the first communicating device.

FIG. 6 is a table showing an example of table information stored in the memory 303.

In FIG. 6, in this case, the media information includes a plurality of electronic files and the extended attribute information shows whether or not each of the operators A, B, and C is accessible to each of the files. That is, to a file 1, the operator A is accessible but the operators B and C are inaccessible; to a file 2, the operators A and C are accessible but the operator B is inaccessible; and, to a file 3, the operators A and B are accessible but the operator C is inaccessible. Further, as shown in the table, for each of the files, storage-location information representing the storage location of the file and history information representing the date of the production of the file are stored.

Figure 7:
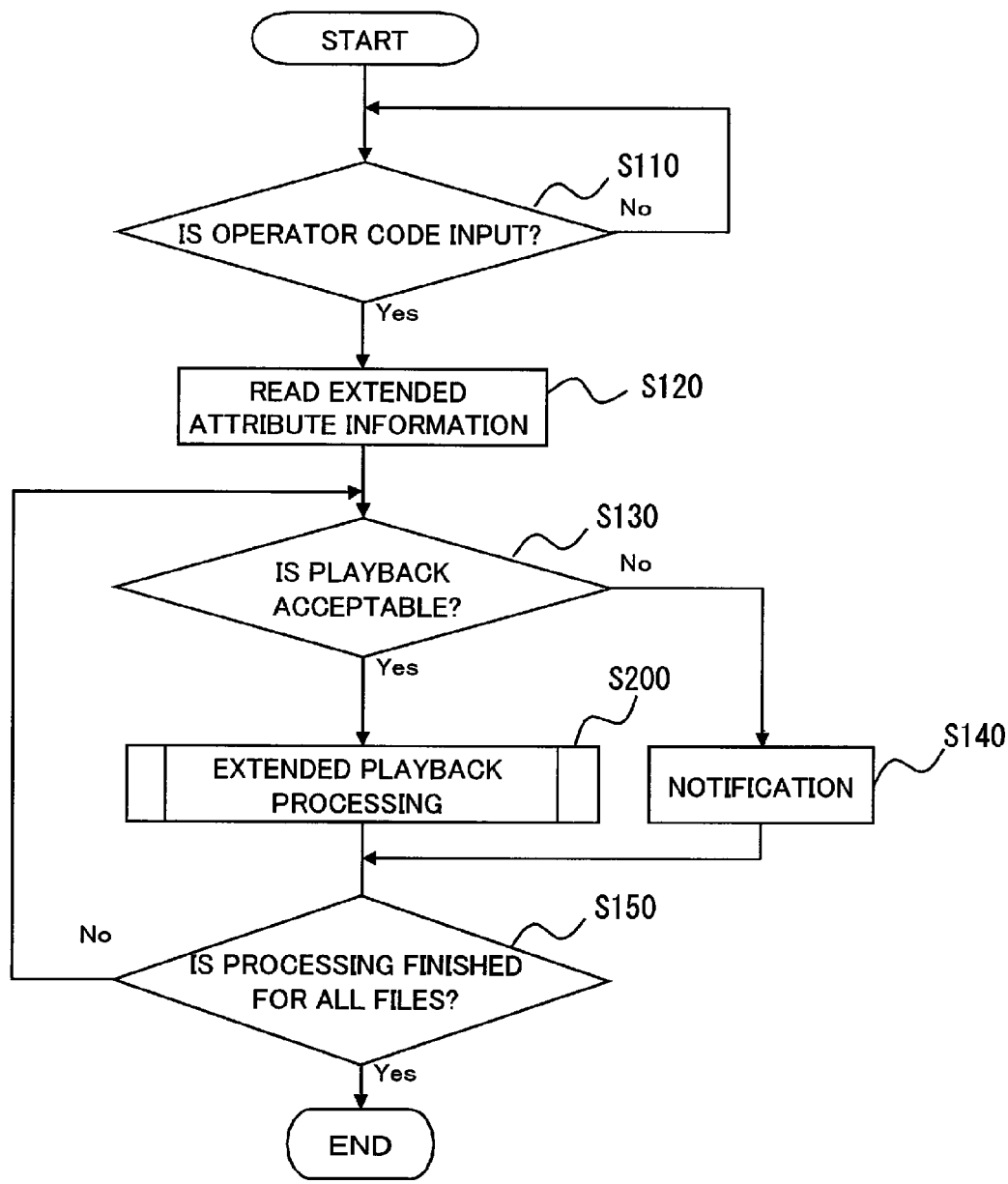
FIG. 7 is a flowchart showing the control procedure carried out with a control circuit in the record playback apparatus when the media information recorded on the disc is read.

FIG. 7 is a flowchart showing the control procedure carried out by the control circuit 302 of the record playback apparatus 300 when media information recorded on a disc D is read.

In FIG. 7, firstly at Step S110, control signals are output to the control circuit 105 in the PC 100 through the interface controller 304 and the connecting means 2, display signals are output from the control circuit 105 to the display 101, thereby the input screen of identification codes to identify an operator is displayed on the display 101, an operator is encouraged to input an identification code, and whether or not the operator has input the identification code with the operation unit 102 in response to the input screen is determined. When the operator has input the identification code, the determination is satisfied and the procedure moves to successive Step S120.

Here, an operator has input an identification code by the operation unit 102 in this case. Besides that, it is also possible to read a barcode as the identification code carried by an operator with a barcode reader, for example. Otherwise, it is also possible to input a password assigned beforehand to each operator in place of the input of an identification code. Still otherwise, it is also possible to make a user account selectable at the start of a PC; select a user account; and input the selected user account instead of an identification code.

At Step S120, control signals are output to the radio frequency circuit 301, a signal to read stored tag information is transmitted to the RFID circuit element To of the disc D, and, in response to that, the extended attribute information showing whether or not an operator is accessible to media information is read and acquired from among the reply signals transmitted (sent back) from the RFID circuit element To. Here, on this occasion, the tag information (the table information, that is, the storage-location information, the history information, and the extended attribute information of relevant media information) read from the RFID circuit element To based on the reply signals is retained in the memory 303.

At succeeding Step S130, the identification code input by the operator is compared with the extended attribute information read from the RFID circuit element To at Step S120 stated above and whether or not the operator can playback the media information is determined. On this occasion, when the media information includes a plurality of files as shown in FIG. 6 stated earlier, the identification code input by the operator is sequentially compared with the extended attribute information of each file and the determination is carried out one by one. When able-to-playback, the determination is satisfied and the procedure moves to succeeding Step S200. When the media information on the disc D is the latest one, the media information is played. When the media information on the disc D is not the latest one, extended playback processing of reading and playing the latest media information stored in the memory 103 of the PC 100 is performed.

Meanwhile, at Step S130, when the operator cannot playback the media information, the determination is not satisfied, the procedure moves to Step S140, and the result is notified to the operator. The notification maybe given for example by outputting control signals to the control circuit 105 in the PC 100 through the interface controller 304 and the connecting means 2; outputting display signals from the control circuit 105 to the display 101; and displaying the notification screen on the display 101 in the PC 100. Otherwise it is also possible to give display by outputting display signals to the display 305 of the record playback apparatus 300.

At succeeding Step S150, whether or not the procedure of Step S130 and Step S200 or S140 is finished for all the files constituting the media information is determined. When the procedure is not finished yet, the procedure goes back to preceding Step S130 and moves to the next file and the procedure succeeding to Step S130 is repeated. When all the files are processed, the determination is satisfied and the flow is terminated.

Here, in the above flow, Step S120 constitutes an acquisition device for storage location configured to acquire storage-location information of the information to be recorded or information corresponding to the storage-location information through the second communicating device, the storage-location information being stored in the IC circuit part of the RFID circuit element in the claims, and Steps S130, S140, and S200 constitute a playback control device configured to restrictively control playback operation of the information playback device based on information acquired by the acquisition device for authority.

Figure 8:
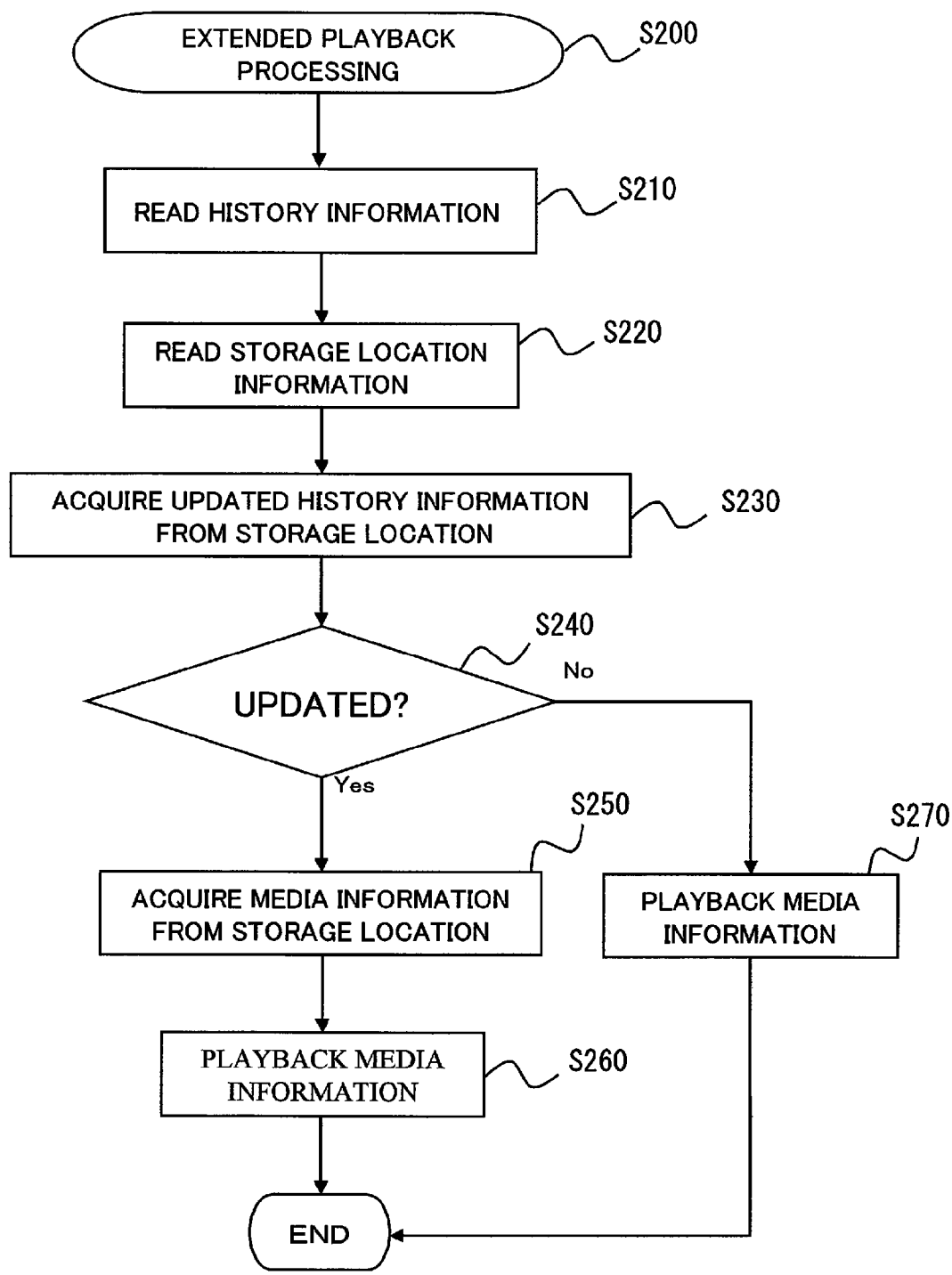
FIG. 8 is a flowchart showing the detailed procedure of Step S200.

FIG. 8 is a flowchart showing detailed procedure of aforementioned Step S200.

In FIG. 8, firstly at Step S210, the history information is read and acquired from among the tag information (the table information, that is, the storage-location information, the history information, and the extended attribute information of relevant media information) read from the RFID circuit element To based on the reply signals at aforementioned Step S120 and stored in the memory 303.

At succeeding Step S220, the storage-location information is read and acquired from among the tag information read from the RFID circuit element To based on the reply signals at aforementioned Step S120 and stored in the memory 303.

At succeeding Step S230, the history information representing the production date of media information stored in the memory 103 is read and acquired in the same way as aforementioned Step S20 by accessing the memory 103 in the PC 100 as the storage location based on the storage-location information acquired at aforementioned Step S220. Here, when the media information in the memory 103 is updated after the disc D is produced, the history information represents the date of the update.

At succeeding Step S240, the history information acquired from the RFID circuit element To at aforementioned Step S210 is compared with the history information acquired from the memory 103 at aforementioned Step S230 and whether or not the media information has been updated is determined. The determination is made by determining whether or not the dates of the two kinds of the history information are the same. That is, it is determined that the update has not been done when the dates are identical and it is determined that the update has been performed when the dates are different from each other. When the update has been performed, the determination is satisfied and the procedure moves to succeeding Step S250.

At Step S250, the updated latest media information is read and acquired from the memory 103 in the PC 100 through the connecting means 2. Here, the acquired media information is temporarily stored in the memory 303.

At succeeding Step S260, the media information read at aforementioned Step S250 is played with a corresponding application. On this occasion, control signals are output to the control circuit 105 in the PC 100 through the interface controller 304 and the connecting means 2, display signals are output from the control circuit 105 to the display 101, and the played media information is displayed on the display 101 in the PC 100. Here, the display may be given on the side of the record playback apparatus by outputting display signals to the display 305 in the record playback apparatus 300. Otherwise on this occasion, a relevant file name may be displayed by file name information contained in the storage-location information. Then the flow is terminated.

Here, when it is determined that the media information is not updated at aforementioned Step S240, the determination is not satisfied, the procedure moves to Step S270, control signals are output to the media reading unit 308, and the media information recorded on the disc D is read and played with a corresponding application. On this occasion, in the same way as aforementioned Step S260, the played media information is displayed on the display 101 in the PC 100. Here, the display may also be given on the side of the record playback apparatus. Then the flow is terminated.

Meanwhile, in the above flow, Step 220 constitutes an acquisition device for storage location configured to acquire storage-location information of the information to be recorded or information corresponding to the storage-location information through the second communicating device, the storage-location information being stored in the IC circuit part of the RFID circuit element. Further, Step S240 constitutes an update judgment device configured to accesses the storage location of the information to be recorded using information acquired by the acquisition device for storage location; and to determine whether or not contents of the information to be recorded in the storage location are updated after the information is recorded in the recording medium by the record device for information. Further, Step S250 constitutes a acquisition device for information to be recorded configured to acquire contents of the information to be recorded after updated from the storage location when it is determined by the update judgment device that the information is updated after recorded in said recording medium.

In the above configuration, the control circuit 302, the radio frequency circuit 301, and the antenna 306 constitute a record device for storage location configured to record storage-location information of the information to be recorded, recorded in the recording medium by the record device for information in a RFID circuit element or in the recording medium, the RFID circuit element being configured to have an IC circuit part to store information and a tag antenna to transmit/receive information, attached to the recording medium; and also constitute a record device for authority configured to record authority information on access to or on various kinds of processing after the access to the information to be recorded, in the RFID circuit element or in the recording medium.

In the present embodiment described above, when media information is recorded on the disc D by the media writing unit 307, the information on the storage location where the media information is stored is recorded in the RFID circuit element To attached to the disc D through the antenna 306. With the arrangement, it is possible to easily confirm whether or not the contents of the media information are updated afterward (after recording is given by the media writing unit 307) by accessing the storage location of the media information using the storage-location information recorded in the RFID circuit element To. As a result, even when the contents of the media information are updated, it is possible to easily obtain the latest contents after updated.

Further, in the present embodiment in particular, in addition to information on the storage location where media information is stored, history information representing the production date of the media information is recorded in the RFID circuit element To. With the arrangement, it is possible to surely confirm whether or not the contents of the media information are updated afterward (after recording is given by the media writing unit 307) by comparing the history information recorded in the RFID circuit element To with the history information of the media information stored in the storage location accessed using the storage-location information.

Furthermore, in the present embodiment in particular, network address information such as URI is recorded in the RFID circuit element To as the information on the storage location where the media information is stored. With the arrangement, it is possible to easily confirm whether or not the contents of the media information are updated afterward by accessing the storage location of the media information using the network address when the media information on the disc D is read.

Yet further, in the present embodiment in particular, a file name is included as the identification information of the media information in the storage-location information of the media information and is recorded in the RFID circuit element To. With the arrangement, it is possible to obviously show the file name of the media information to an operator; and further improve user-friendliness.

Still further, in the present embodiment in particular, the storage-location information in each file of media information having a plurality of files is recorded in the RFID circuit element To. With the arrangement, it is possible to easily confirm whether or not the contents are updated afterward (after recording is given by the media writing unit 307) for each file by accessing each storage location even when the plural files contained in the media information are stored in different storage locations for each file.

In addition, in the present embodiment in particular, the extended attribute information showing whether or not an operator can access media information is recorded in the RFID circuit element To, the extended attribute information is compared with an operator code for reading at the time of the reading of a disc, and thereby whether or not the media information is accessible is determined. With the arrangement, it is possible to playback media information set appropriately in accordance with a person or an area even though the media information is recorded on an identical disc, for example, whether or not a file can be played is changed based on whether a playback apparatus is installed in a children's room or an adult's room; or sold in the area of Japan or the U.S.A. In this manner, it is possible to set executable processing for each person or each playback apparatus in accordance with the state of disc management by an operator or the state of the usage of a record playback apparatus; and realize a wider variety of management.

Note that, the present invention is not limited to the aforementioned embodiments and can be variously modified within the range not deviating from the gist and the technological concept of the present invention. Such variations will be described hereunder.

(1) When Storing Media Information in a Server Connected to a Network

Although media information to be recorded is stored in the memory 103 of the PC 100 in the aforementioned embodiment, besides that, it is also possible to store the media information outside the PC 100, for example, in a data server or the like connected to a network.

Figure 9:
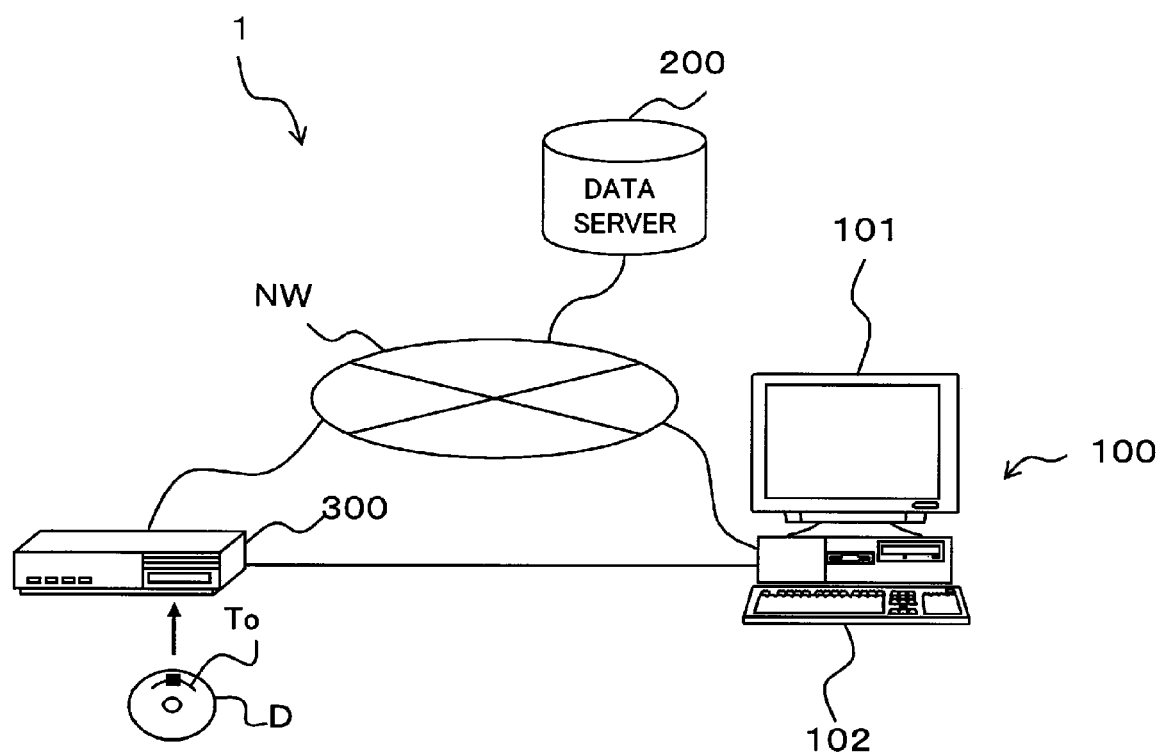
FIG. 9 is a system configuration diagram showing a whole media record and playback system including a record playback apparatus in a variation when media information is stored in a server connected to a network.
Figure 10:
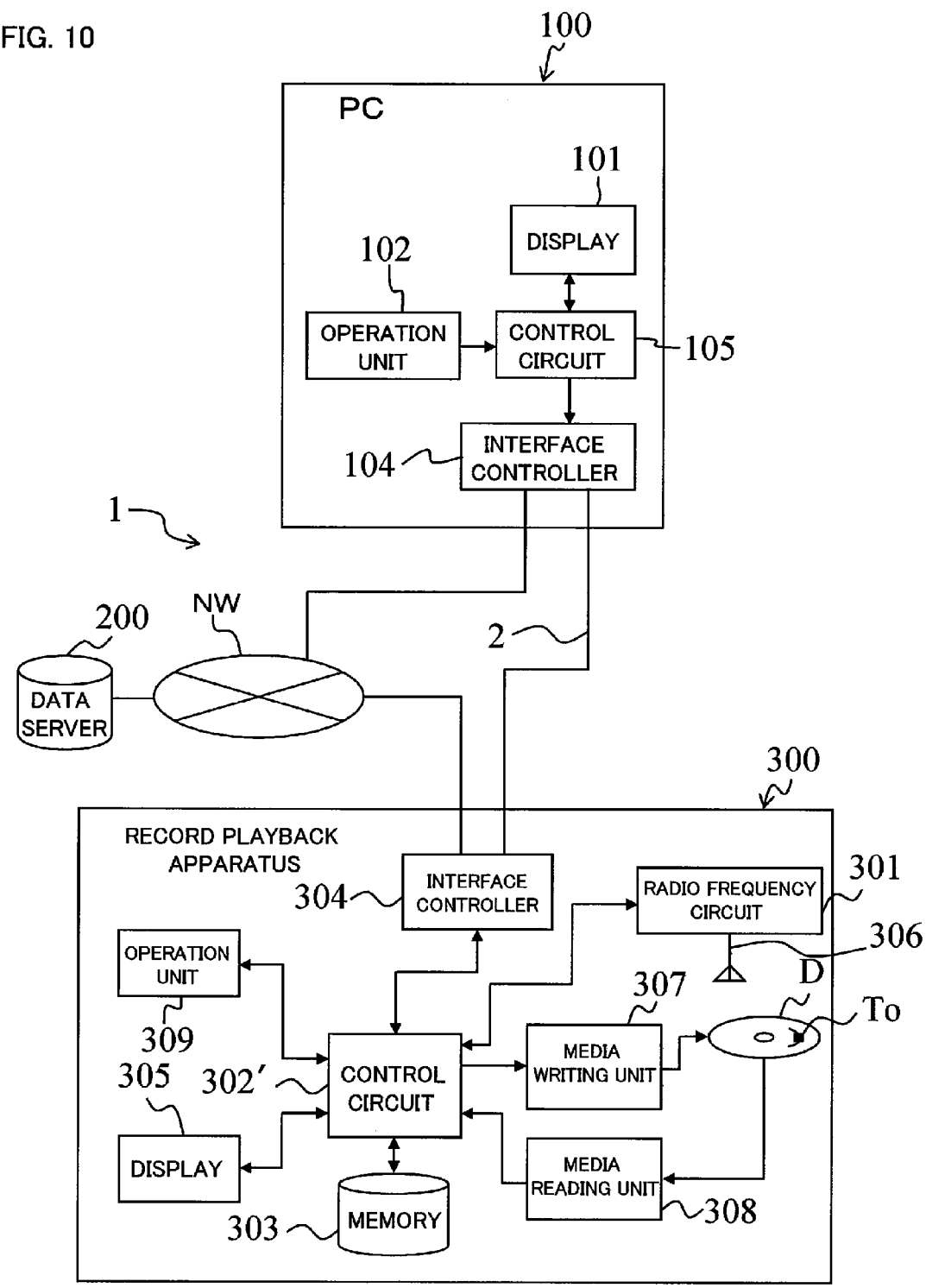
FIG. 10 is a functional block diagram showing detailed functions of a PC and a record playback apparatus constituting the media record and playback system in the variation when the media information is stored in the server connected to the network.

FIG. 9 is a system configuration diagram showing a whole media record and playback system 1 including a record playback apparatus 300 (a record apparatus, a record and playback system) in the present variation, and FIG. 10 is a functional block diagram showing detailed functions of a PC 100 and the record playback apparatus 300 constituting the media record and playback system 1. The figures correspond to FIGS. 1 and 2 stated earlier, respectively. In the figures, the parts similar to those in FIGS. 1 and 2 are represented by the same reference numerals and characters and the descriptions thereof are omitted.

As shown in FIGS. 9 and 10, a media record and playback system 1 according to the present variation has a data server 200 connected to a PC 100 and a record playback apparatus 300 so as to be able to transmit and receive information through a communication line NW such as the Internet for example. In the present variation, the PC 100 does not have a memory 103 and media information given a file name by an operator and retained in the PC 100 is stored in the data server 200 through the communication line NW.

Figure 11:
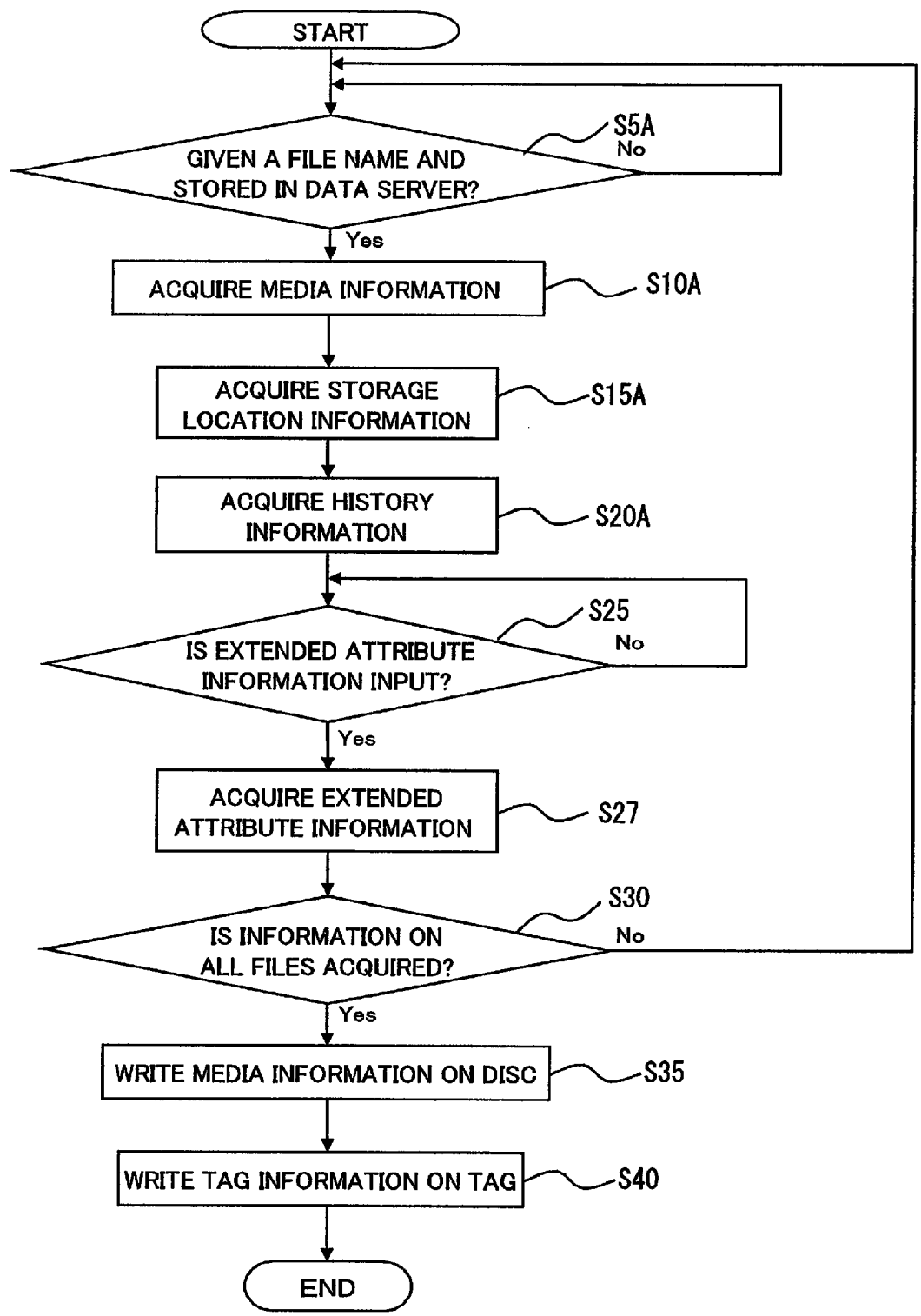
FIG. 11 is a flowchart showing the control procedure carried out with a control circuit in the record playback apparatus when media information is recorded on a disc in the variation when the media information is stored in the server connected to the network.

FIG. 11 is a flowchart showing the control procedure carried out by a control circuit 302' (refer to FIG. 10) in the record playback apparatus 300 when media information is recorded on the disc D; and corresponds to FIG. 5 stated earlier. The same procedures as those shown in FIG. 5 are represented by the same reference numerals and characters and the descriptions thereof are omitted.

In FIG. 10, firstly at Step S5A, whether or not an operator has given a file name to media information and stored the media information in the data server 200 through the communication line NW with the PC 100 is determined. When the media information is stored, the determination is satisfied and the procedure moves to succeeding Step S10A.

At Step S10A, the media information is read and acquired from the data server 200 through the communication line NW. Here, the acquired media information is temporarily stored in a memory 303.

At succeeding Step S15A, storage-location information representing the location of the media information in the network (network address information such as URI (Uniform Resource Identifier)) is read and acquired based on the media information stored in the data server 200. Here, the acquired storage-location information is temporarily stored in the memory 303.

At succeeding Step S20A, history information representing the production date (in other words, date when the media information is retained in the data server 200) of the media information is read and acquired based on the media information stored in the data server 200. Here, the acquired history information is temporarily stored in the memory 303.

The succeeding Step S25 and successive steps are the same as the steps shown in FIG. 5 stated earlier. That is, extended attribute information on the media information input by an operator is acquired and storage-location information, history information, and extended attribute information are acquired sequentially for all the media information. Thereby a table shown in FIG. 12 to be described later is produced in the memory 303. Then all of the media information is written on a disc D and the table information (the storage-location information, the history information, and the extended attribute information of each piece of media information) produced in the memory 303 is written in a RFID circuit element To attached to the disc D through an antenna 306. After those steps, the flow is terminated.

FIG. 12 is a table showing an example of the table information recorded in the memory 303 according to the present variation. In this example, a network address showing the storage location of each of files in the data server 200 is stored as the storage-location information representing the storage location of the file. The others are the same as those shown in FIG. 6 stated earlier and hence descriptions are omitted.

Here, the control carried out when media information recorded on the disc D is read by the record playback apparatus 300 according to the present variation is similar to the control in the aforementioned embodiment and hence descriptions are omitted.

The variation described above can also exhibit the effects similar to the aforementioned embodiment.

(2) Others

In the above embodiment, extended attribute information and others (storage-location information, history information, and extended attribute information) other than media information are recorded in a RFID circuit element To attached to a disc D. Besides that, it is also possible to write and record the above information, together with media information, on a disc D by a media writing unit 307. On this occasion, by reading the extended attribute information and others (the storage-location information, the history information, and the extended attribute information) together with the media information when the disc is read by the media reading unit 308, it is possible to apply the same control and obtain the same effects as in the cases of the aforementioned embodiment.

Further, in the above embodiment, information representing whether or not an operator's access itself to media information is accepted is written in a RFID circuit element To as extended attribute information. Besides that, it is also possible to write such information as to restrict various kinds of processing after operator's access in a RFID circuit element To as the extended attribute information, for example, a case where an operator can access information but cannot inquire the update, a case where an operator can playback a file but cannot edit or download the file, or a case where characters or mosaics are inserted in an image after played. Moreover, it is also possible to set a password for each processing operation without personal identification. In this case, it is possible to set the processing range for each processing operation and variously manage the media information.

Furthermore, in the above embodiment, the data itself of extended attribute information and others (storage-location information, history information, and extended attribute information) is written in a RFID circuit element To attached to a disc D. However, for example, when the media information recorded on a disc D includes a large number of files, it may be possible that the extended attribute information and others cannot be written in the RFID circuit element To due to its large capacity. In this case, it is also possible to store the extended attribute information and others in the memory 103 in the PC 100 (or in the data server 200); and write identification information correlated with the information in the RFID circuit element To. In this case too, the same effects as those in the aforementioned embodiment can be obtained.

Yet further, like the above variation (1) wherein media information is read from a data server 200 through a communication line NW, when data is downloaded through a network, it is also possible to take time for the download of the media information at a certain information communication speed of the network. In such a case, when the media information is updated, it is also possible to notify an operator that it takes time for the download; and thereafter carry out the playback processing of the media information. Here, when the media information is not updated, the media information recorded on the disc D may be read as it is.

Still further, in the above cases, descriptions have been given based on the case where information is optically recorded on a recording medium as an optical disc such as a CD (Compact Disc), a DVD (Digital Versatile Disc), or the like. Besides that however, the present invention is also applicable to the case of recording information on a recording medium such as a magnetic disc, an MO (Magneto Optical Disc) of a magneto-optical type, or the like.

Still further, in addition to the aforementioned cases, it is also possible to appropriately combine and use methods in the aforementioned embodiment and variations.

The present invention can be applied in variously modified manners within the range not deviating from the gist of the present invention, although those are not dared to be exemplified.

What is claimed is:

1. A record apparatus comprising:
   a record device for information configured to record information to be recorded in a recording medium, said record information being stored electronically in a predetermined storage location; and
   a record device for storage location configured to record storage-location information of said information to be recorded in said recording medium by said record device for information in a RFID circuit element or in said recording medium, said RFID circuit element being configured to have an IC circuit part to store information and a tag antenna to transmit/receive information, attached to said recording medium.

2. A record apparatus according to claim 1, wherein:
said record device for storage location records history information of said information to be recorded as well as said storage-location information, in said RFID circuit element or in said recording medium.

3. A record apparatus according to claim 1, wherein:
said record device for storage location records a network address as said storage-location information in said RFID circuit element or in said recording medium.

4. A record apparatus according to claim 1, wherein:
said record device for storage location records identification information of said information to be recorded in said RFID circuit element or in said recording medium.

5. A record apparatus according to claim 1, wherein:
said record device for storage location records said storage-location information as to each of a plurality of files included in said information to be recorded, in said RFID circuit element or in said recording medium.

6. A record apparatus according to claim 5, further comprising a record device for authority configured to record authority information on access to or on various kinds of processing after access to said information to be recorded, in said RFID circuit element or in said recording medium.

7. A record apparatus according to claim 6, further comprising an authority-information setting device configured to receive an instruction signal for setting an authority and set said authority information corresponding thereto, wherein
said record device for authority records said authority information set by said authority-information setting device in said RFID circuit element or in said recording medium.

8. A record apparatus according to claim 7, wherein:
said authority-information setting device is configured to be able to set whether or not said access to or said various kinds of processing after said access to said information to be recorded can be accepted, in accordance with a plurality of operators and said plurality of files.

9. A record apparatus according to claim 1, wherein:
said record device for storage location including:
a first communicating device configured to transmit/receive information to/from said RFID circuit element via radio communication; and
a writing control device configured to write said storage-location information or information corresponding thereto in said IC circuit part of said RFID circuit element through said first communicating device.

10. A record and playback system comprising:
a record device for information configured to record information to be recorded in a recording medium, said record information being stored electronically in a predetermined storage location;
an information playback device configured to playback said information to be recorded, recorded in said recording medium;
a second communicating device configured to transmit/receive information to/from said a RFID circuit element via radio communication and disposed at said recording medium, said RFID circuit element having an IC circuit part to store information and an antenna to transmit/receive information;
a acquisition device for storage location configured to acquire storage-location information of said information to be recorded or information corresponding to said storage-location information through said second communicating device, said storage-location information being stored in said IC circuit part of said RFID circuit element; and
an update judgment device configured to access a storage location of said information to be recorded using information acquired by said acquisition device for storage location, and to determine whether or not contents of information to be recorded in the storage location are updated after the information is recorded in said recording medium by said record device for information.

11. A record and playback system according to claim 10, further comprising an acquisition device for information to be recorded configured to acquire contents of said information to be recorded after updated from said storage location when it is determined by said update judgment device that the information is updated after recorded in said recording medium.

12. A record and playback system according to claim 10, further comprising:
an acquisition device for authority configured to acquire authority information of said information to be recorded or information corresponding to said authority information through said second communicating device, said authority information being stored in said IC circuit part of said RFID circuit element; and
a playback control device configured to restrictively control playback operation of said information playback device based on information acquired by said acquisition device for authority.

* * * * *